Patented Sept. 1, 1936

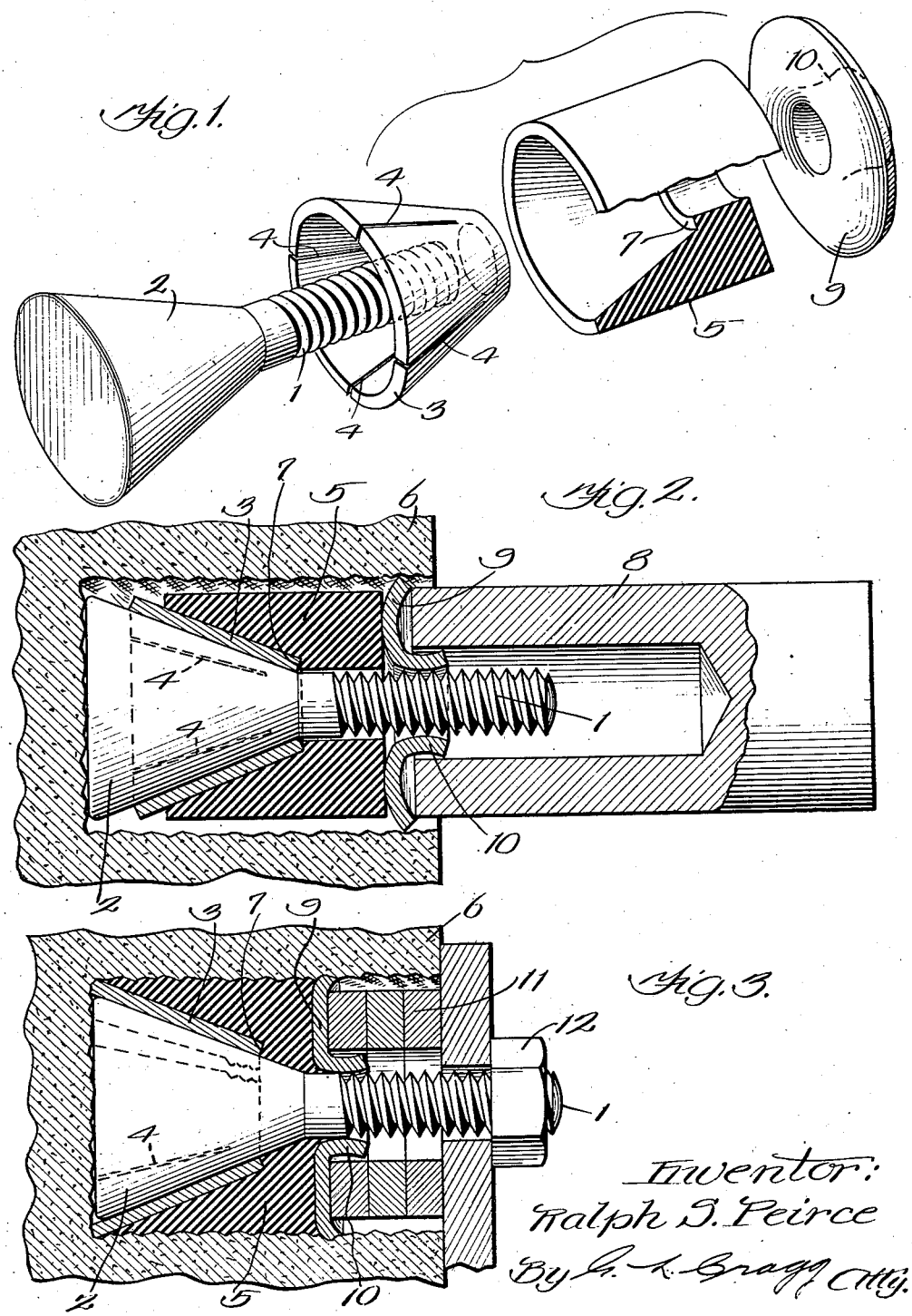

2,052,793

UNITED STATES PATENT OFFICE 2,052,793

ANCHORING DEVICE

Ralph S. Peirce, Hinsdale, Ill.

Application February 20, 1930, Serial No. 429,978

10 Claims. (Cl. 72—105)

My invention relates to anchoring devices which are generally inclusive of a bolt provided with an enlargement thereon and having expansible members surrounding the bolt shank.

The invention is of particular utility in providing an anchoring device or expansion insert for attachment of objects to masonry, tile or the like, and, among other objects, the invention provides an improved device for this purpose.

One important object of the invention is to provide means for preventing the exudation rearwardly of the bolt or other holding member, of the soft metal part of the device, such exudation being highly disadvantageous by reason of the detracting from the lateral expansion which is desired for the maximum holding power.

Another object of the invention is to provide a collar adjacent the outer end of the device which serves to receive the impacting tool and by its improved formation desirably prevents exudation of the soft metal part outwardly of the device when the device is being impacted, and, also, prior thereto, by engagement with the bolt or other holding member, assists in holding the parts together against casual separation so that they may be shipped without other securing means, the parts remaining together as intended and eliminating the necessity of placing a nut on the bolt, in the case of a threaded bolt, to hold the parts together. The custom of placing a nut on the bolt to hold the parts together as has been hereto, is time-consuming both in placing the nut thereon for shipment, then removing it before the device is expanded and finally replacing the nut after the device is expanded. In accordance with my invention the nuts may be packed separately, thus necessitating their being screwed on the shank of the bolt but once.

Other objects and advantages will be apparent from the following description taken together with the accompanying drawing in which—

Figure 1 is a perspective exploded view of an anchoring device constructed in accordance with my invention, parts being broken away for clearness of description;

Figure 2 is a view illustrating a portion of a wall or other support in section and an anchoring device of my invention partially in section and partly in elevation, an impacting tool also being illustrated, partially in section and partly in elevation, this figure illustrating the anchoring device before the impacting tool has acted thereon; and Figure 3 is a view generally similar to Fig. 2 but showing the parts of the anchoring device after the impacting tool has acted thereupon and illustrating a filler which, also in accordance with my invention, may be interposed between the setting collar and the nut that is screwed upon the bolt.

Referring in detail to the illustrative embodiment shown in the drawing, the holding member 1 is shown in the form of a bolt having a threaded shank at its outer end and an expanding member thereon in the form of an enlargement 2, which may constitute a bolt head. This enlargement is shown as being bigger, in proportion to the shank, than may actually be true in practice, but it is thus illustrated for the sake of clearness. The said enlargement, as shown, tapers from its end of the bolt toward the other bolt end, that is its diameter is reduced from the inner end of the bolt toward the outer end.

What I have termed a metal shell 3 is then placed on the bolt, said shell, in this instance, tapering similarly to the enlargement 2 upon its inner and outer broad surfaces and thus being adapted to snugly receive the bolt enlargement. This shell is itself expansible and is desirably formed with slits to assist in its expansion, such for example as the slits 4 extending longitudinally for a portion of the length of the shell. The shell, however, initially is unexpanded and terminates short of the largest diameter of the enlargement 2. In this instance the shell 3 initially encircles the enlargement substantially continuously (i. e. the slits 4 then being unopened) at a point relatively near the greatest diameter of the cone-shaped enlargement 2.

The other expansible member or soft metal part or sleeve 5 is formed of metal, such as lead, relatively softer than the metal of the shell 3. As here shown, said sleeve 5 has a generally cylindrical exterior surface and a bore having one portion, its outer portion, also generally cylindrical, and contiguous with the bolt shank, and another bore portion which tapers similarly to the taper of the shell and bolt enlargement. The sleeve 5 initially desirably terminates short of the larger or inner end of the shell and extends outwardly beyond the smaller or outer end of the shell, which thus abuts the interior annular shoulder 7 of the sleeve.

To complete the assembly of my device, I desirably include a washer or setting or impacting collar 9 on the bolt after the shell and sleeve are placed thereon. The setting collar 9 is of metal harder than the metal of the sleeve 5, for example being of soft steel, so as to be deformable under the force of the impacting tool 8. The setting collar 9 desirably has a broad face of greater diameter than the impacting tool and also a greater diameter than the sleeve 5, the hole of the setting tool which receives the bolt being also of small enough diameter to advantageously have marked frictional engagement with the bolt shank. As here shown also the setting collar is desirably of dished formation to provide an annular pocket for receiving the annular end of the impacting tool 8, to position the tool with respect to the bolt shank and protect the threads upon the bolt. The threads may be further protected and the frictional engagement of the setting collar with the bolt may be further enhanced by providing a guarding continuation 10 on the setting collar, this guard continuation surrounding the bolt and extending away from the sleeve 5. The collar 9 also tends to flatten out into contact with the hole, preventing exuding of the soft metal 5 outwardly.

It will be understood that to set or expand the device as shown in Fig. 3, the impacting tool 8 is forced against the collar 9 which in turn forces the sleeve 5 against the shell 3 and at the same time expands the soft metal of the sleeve 5 laterally. Also, since the shell 3 is also deformable, this shell is also expanded laterally, and in this instance is expanded over the tapered head 2 of the bolt. As constructed and arranged, the shell 3 by expanding, ensures the lateral expansion of the sleeve 5 toward the lateral walls of the hole in the masonry 6 and prevents exudation of the soft metal part or sleeve 5 around the inner end of the bolt head 2. The shell 3 therefore provides an expanding member which automatically adjusts itself to variations which may occur in practice in relative sizes of holes and bolts therefor. The interengaging means as at 7 between the sleeve and shell assists in this by retarding slippage between the shell 3 and the sleeve 5.

I may provide a filler 11, which may be of annular sectional formation, this filler being adapted to be interposed between the nut 12 that is screwed upon the bolt, and the setting collar 9. The filler may serve as a setting tool that may be actuated by tightening the nut 12, and when so actuated, serving to expand the member 5, by reason of the tendency of the bolt and nut to move in opposite directions, this force being exerted upon the filler through the intermediation of an object which the nut 12 clamps to the masonry 6. The filler 5 is advantageously made of some material such as asbestos which is not only non-heat conducting but which also being of yieldable formation, the filler is capable of collapsing when sufficient pressure is placed thereon so that when resistance to further inward movement of the expansible members reaches a given value, the filler will collapse and permit the article to be supported between the wall and the nut 12 to be drawn, by the nut 12, into tight abutment with the wall 6.

The invention is of course not limited to the details of construction shown for purposes of illustration. Furthermore, it is not indispensable that all features of the invention be used conjointly, as sub-combinations of my invention are highly useful.

Having described my invention, I claim:

1. An anchoring device comprising the combination with a bolt having an enlargement at its inner end, said enlargement tapering toward the outer bolt end; of an expansible metal shell surrounding said enlargement and terminating short of the inner end of the bolt, said shell having an outer surface tapering toward the outer bolt end; an expansible member formed of metal softer than the metal of the shell and having a bore with a surface tapering similarly to said shell, said expansible member terminating short of the larger end of the shell; and interengaging formations upon the shell and expansible member which obstruct slippage between these two elements when the expansible member and the larger end of the bolt enlargement approach one toward the other.

2. An anchoring device comprising the combination with a bolt; of an expanding member upon said bolt at its inner end, said expanding member tapering from its end of the bolt toward the outer bolt end; a metal expansible member adapted to be laterally expanded by movement over said expanding member toward the inner end of the bolt; a metal expansible shell between said expanding member and said expansible member, said shell being formed of metal relatively harder than the metal of the expansible member; and interengaging means between said shell and said expansible member whereby slippage is retarded between these two elements when the expansible member and the larger end of the expanding member approach one toward the other.

3. An anchoring device comprising the combination with a bolt having an expanding member at one end, said expanding member tapering toward the other bolt end; of an expansible metal shell surrounding said expanding member and tapering similarly thereto upon its inner and outer broad surfaces; and an expansible member formed of metal relatively softer than the metal of the shell and having a generally cylindrical outer surface and a bore having a surface tapering similarly to said shell, said expansible member terminating short of the larger end of the shell and extending beyond the smaller end of the shell, whereby said shell is adapted to have pressure exerted upon it through the intermediation of said expansible member, and said shell and said expansible member tend to move simultaneously over said expanding member under said pressure.

4. An anchoring device comprising the combination with a member having an enlargement at its inner end, said enlargement tapering toward the outer end of the member, of an expanding metal shell surrounding the member and initially terminating short of the inner end of the member, said shell having an outer surface tapering toward the outer member end; and an expansible sleeve formed of metal softer than the metal of the shell and having a generally cylindrical outer surface, said expansible sleeve terminating short of the larger end of the shell and extending beyond the smaller end of the shell.

5. An anchoring device comprising the combination with a bolt having a threaded shank and an enlargement at its inner end, said enlargement tapering toward the shank; of a metal shell surrounding said enlargement and snugly receiving the same; said shell being substantially continuous around the enlargement at a point relatively near the greatest diameter of the enlargement; slits in said shell at its end of greatest diameter whereby the shell may be moved over the enlargement in the direction of the greatest diameter of the enlargement; and an expansible member formed of metal relatively softer than the metal of the shell and having a generally cylindrical outer surface and a bore having one surface tapering similarly to the shell and another surface contiguous with the bolt shank, said expansible member terminating short of the larger end of the shell and extending beyond the smaller end of the shell.

6. An anchoring device comprising the combination with a bolt having an expanding member at one end, said expanding member tapering toward the other bolt end; of an expansible metal shell surrounding said expanding member and snugly receiving the same and tapering similarly thereto upon its inner and outer broad surfaces, said shell being substantially continuous around the expanding member at a point relatively near the greatest diameter of the expanding member; slits in said shell at its end of greatest diameter, whereby the shell may be moved over the expanding member in the direction of the greatest diameter of the expanding member; and an expansible member formed of metal relatively softer than the metal of the shell and having a generally cylindrical outer surface and a bore having a surface tapering similarly to the shell.

7. An anchoring device for attachment by expansion to masonry, tile or the like including in combination a tapered member, a setting collar, a soft metal part between the tapered member and the setting collar, and an expansion shell between the tapered member and the soft metal part, the setting collar being arranged adjacent to the soft metal part prior to expansion of the device, whereby to provide for expansion of both the shell and the soft metal part by advancing the setting collar against the soft metal part.

8. An anchoring device of the character described adapted to be expanded after insertion into an aperture in masonry, tile or the like including in combination a tapered member, a setting collar engaging said tapered member, a soft metal part between the tapered portion of said member and the setting collar, and an expansion shell between the said tapered portion of said member and the soft metal part, said engagement of said tapered member and setting collar holding the parts together against casual separation.

9. An anchoring device of the character described, including the combination of a member having a shank and a head member on the inner end of the shank, an expansible shell surrounding the shank and abutting the head, a sleeve of relatively soft metal abutting the expansible shell, and an impacting collar abutting the soft metal sleeve and adapted to be engaged by an impacting tool to expand the soft metal sleeve and shell upon said head.

10. An anchoring device including the combination of an expansible sleeve of relatively soft metal, an expansible shell at one end thereof in abutment therewith, and an expanding collar at the other end thereof and in abutment therewith, said shell and collar being of deformable but relatively harder material than the sleeve.

RALPH S. PEIRCE.